United States Patent
Gould et al.

(10) Patent No.: US 7,526,248 B2
(45) Date of Patent: Apr. 28, 2009

(54) EXTENDED WIRELESS COMMUNICATION SYSTEM AND METHOD

(75) Inventors: Adam Gould, San Diego, CA (US); Michael S. Librizzi, San Diego, CA (US); Kenneth L. Stanwood, San Diego, CA (US)

(73) Assignee: NextWave Broadband, Inc., San Diego, CA (US)

( * ) Notice: Subject to any disclaimer, the term of this patent is extended or adjusted under 35 U.S.C. 154(b) by 548 days.

(21) Appl. No.: 11/447,466

(22) Filed: Jun. 6, 2006

(65) Prior Publication Data

US 2007/0281608 A1 Dec. 6, 2007

(51) Int. Cl.
H04B 7/00 (2006.01)

(52) U.S. Cl. .................. 455/11.1; 455/15; 455/507; 455/407

(58) Field of Classification Search ............... 455/11.1, 455/13.3, 15, 552.1, 556.1, 557, 507, 407; 725/62, 109, 111
See application file for complete search history.

(56) References Cited

U.S. PATENT DOCUMENTS

| | | | | |
|---|---|---|---|---|
| 5,634,193 A | * | 5/1997 | Ghisler | .............. 455/440 |
| 2002/0147978 A1 | * | 10/2002 | Dolgonos et al. | ............. 725/62 |
| 2002/0166124 A1 | | 11/2002 | Gurantz et al. | |
| 2003/0031191 A1 | | 2/2003 | El Wardani et al. | |
| 2003/0046706 A1 | | 3/2003 | Rakib | |
| 2005/0114904 A1 | | 5/2005 | Monk et al. | |
| 2005/0235333 A1 | * | 10/2005 | Bertonis et al. | ............. 725/111 |

OTHER PUBLICATIONS

Auraone Systems, Inc., "Revolutionizing Digital Entertainment Forever", Retrieved from the internet: http://www.auraone.com (Printed Aug. 16, 2006).
Auraone Systems, Inc. "Revolutionizing Digital Entertainment Forever: Products", Retrieved from the internet: http://www.auraone.com/product.htm (Printed Aug. 16, 2006).

* cited by examiner

*Primary Examiner*—Tan Trinh
(74) *Attorney, Agent, or Firm*—Procopio, Cory, Hargreaves & Savitch LLP (57) ABSTRACT

An extended wireless communication system allows a subscriber station which has an unacceptable (weak or inoperative) wireless link to a base transmitter station to communicate with the network via a wire connection to a second subscriber station which has a strong wireless link to the network. A first subscriber station which has an unacceptable first wireless link to a base station of the network uses a second wireless subscriber station which has a strong or acceptable second wireless link to the local base station to relay data back and forth between the first subscriber station and the network. The first and second stations are configured to send data to and from the first station via the second wireless link, the second station, and an existing wire connection between the first and second subscriber stations.

20 Claims, 8 Drawing Sheets

EXTENDED WIRELESS COMMUNICATION SYSTEM AND METHOD

BACKGROUND

1. Field of the Invention

The present invention relates generally to wireless and cable network systems, and is concerned with a wireless communication system and method in which the network can be extended to users having a disadvantaged or non-functional wireless link to the network.

2. Related Art

Wireless communication networks typically have a plurality of servicing base stations which receive and transmit signals to users' devices within the service area of the respective base stations. The users' devices may be mobile communication devices or may be receiving signals at a location such as a home or business wireless subscriber station. Wireless subscriber stations which receive only weak signals from the closest servicing base station will be at a disadvantage and may be unable to receive high data rate information.

In contrast to wireless data communications, cable systems use coaxial cable and cable modems for video and data communications to home or office televisions, computers, and the like.

SUMMARY

The present invention can provide a new and improved method and system for extending a wireless communication system to disadvantaged users.

According to one aspect of the present invention, a method of providing network communication with a wireless subscriber station having an unacceptable or disadvantaged wireless link to an associated base transmitter station of the network is provided, which comprises the steps of:

determining if a first wireless subscriber station has an unacceptable wireless link to a base transmitter station of the network;

if the wireless link between the first subscriber station and base transmitter station is unacceptable, finding a second wireless subscriber station which has an acceptable wireless link to a base transmitter station of the network; and configuring the first and second subscriber stations to relay data to and from the first wireless subscriber station via an existing wire connection between the stations, the second wireless subscriber station, and the second wireless link.

The existing wire connection in an exemplary embodiment of the invention is a cable plant for coaxial cable based TV service, and in this case an unused part of the cable spectrum is used for conveying data back and forth between the wireless network and first subscriber station via the second subscriber station. In another embodiment, the existing wire connection is an electrical power line.

The second wireless subscriber station may be in communication with the same base transmitter station with which the first subscriber station has an unacceptable connection, or with a different base transmitter station of the network. An unacceptable wireless link may be a weak wireless link or a completely non-functional wireless link, for example as a result of buildings, hills or other features between the antenna of the first subscriber station and the base transmitter station, or as a result of some other malfunction of the system. A weak wireless link is defined as a link which is unable to handle high data rate information, i.e. a link which cannot convey sufficient bandwidth in the available time. This method allows a subscriber station to continue to stay in contact with a wireless network to send and receive data even if the direct wireless link to the base transmitter station is too weak for optimum communications, or is inoperative.

In an exemplary embodiment, signals to and from each disadvantaged subscriber station with an unacceptable wireless link to the network will be routed to another subscriber station having a strong or acceptable link with the network via a wire connection to the other subscriber station, and both subscriber stations will be configured to accomplish this signal routing. The first or disadvantaged subscriber station will be configured to pass external data through and receive data from the wire connection and second subscriber station, and the second subscriber station with the strong or acceptable wireless link will be configured to relay data received from the first subscriber station over the wire connection to its wireless link and to relay data for the first subscriber station received via the second or strong wireless link to the first subscriber station via the wire connection or cable plant.

According to another aspect, a communication system is provided, which comprises one or more base transmitter stations for receiving and transmitting wireless signals over a wireless network, first and second subscriber stations each connected to a respective internal home network, a wire connection between the first and second fixed subscriber stations, the first subscriber station has a first external wireless network module for receiving and transmitting wireless signals over a first wireless link and a first wire access module linked to the first external wireless network module and linked to the wire connection for receiving and transmitting data over the wire connection, the second subscriber station has a second external wireless network module for receiving and transmitting wireless signals over a second wireless link and a second wire access module linked to the first external wireless network module and linked to the wire connection for receiving and transmitting data over the wire connection, and the first and second fixed subscriber stations are configured to relay data to and from the first external wireless module via the first wire access module, the wire connection, the second wire access module, the second external wireless module, and the second wireless link if the quality of the first wireless link with the network is determined to be unacceptable.

In this method and system, a first subscriber station which has an unacceptable (i.e. weak or non-functional) wireless connection to a base transmitter station can take advantage of an existing second subscriber station which has a strong link to a base transmitter station to receive and transmit information via a common wire connection linking the two subscriber stations, rather than directly via the wireless link to the base transmitter station. The link between each wire access module and the wire connection or cable plant may be wired, wireless, or a combination of a wired and wireless connection.

The second subscriber station receives information intended for the first subscriber station over the second wireless link. The information intended for the first subscriber station is then extracted and retransmitted from the second subscriber station to the first subscriber station via the wire connection at a selected carrier frequency which will not interfere with the normal transmission for which the wire connection is used.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, will be better understood from the following detailed description of some exemplary embodiments of the invention, taken in conjunction with the accompanying drawings, in which like reference numerals refer to like parts, and in which.

DETAILED DESCRIPTION

Figure 1:
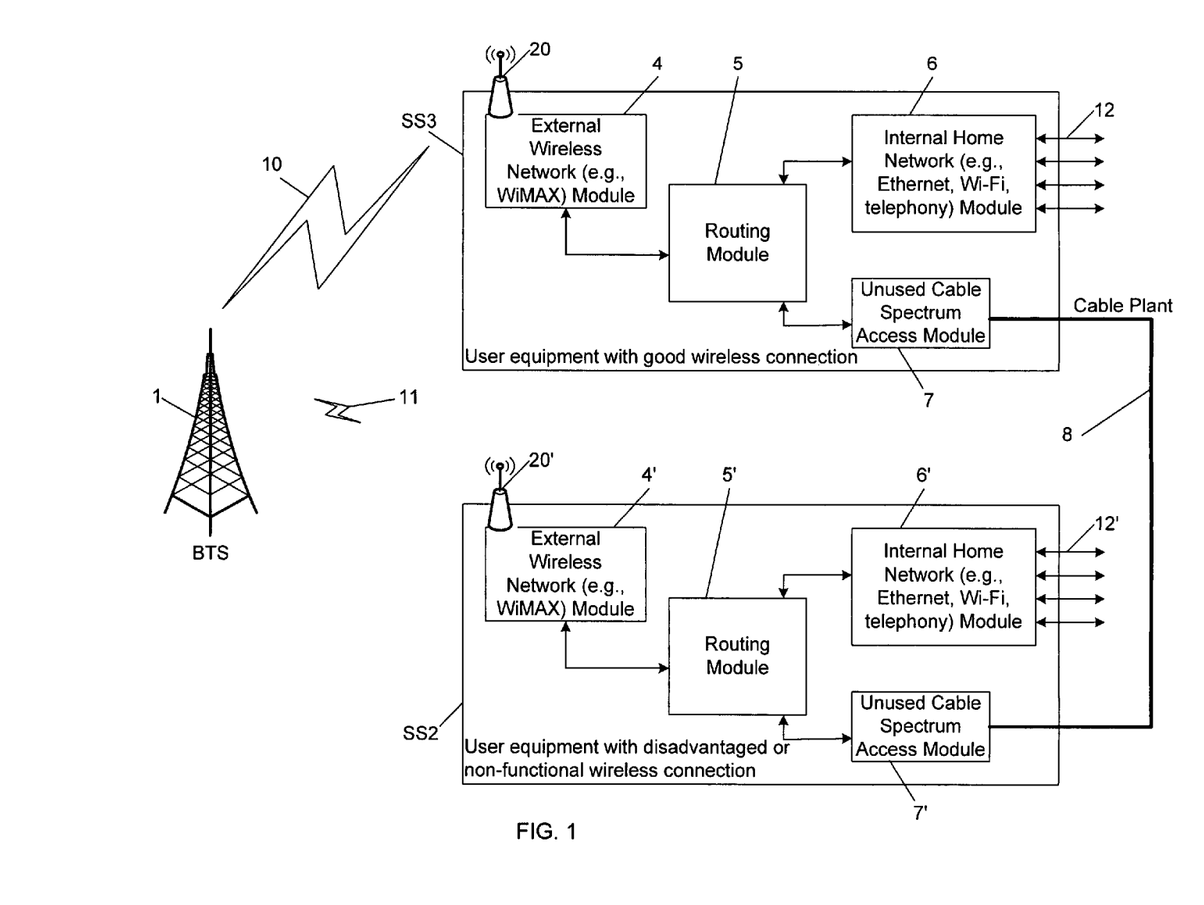
FIG. 1 is a block diagram of an extended communication system according to an exemplary embodiment of the invention.
Figure 6:
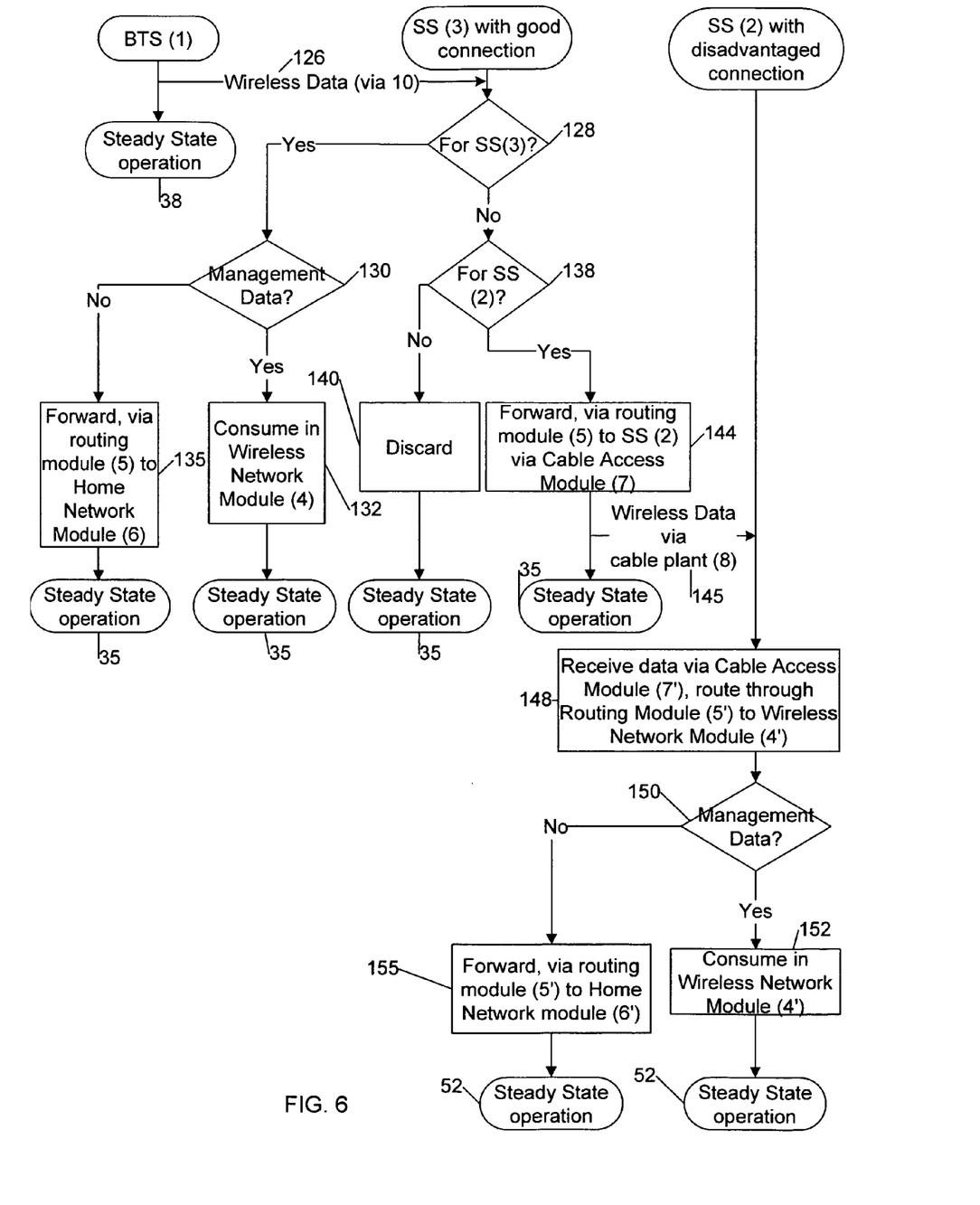
FIG. 6 is a flow diagram illustrating relay of data to a subscriber station over a cable plant.
Figure 7:
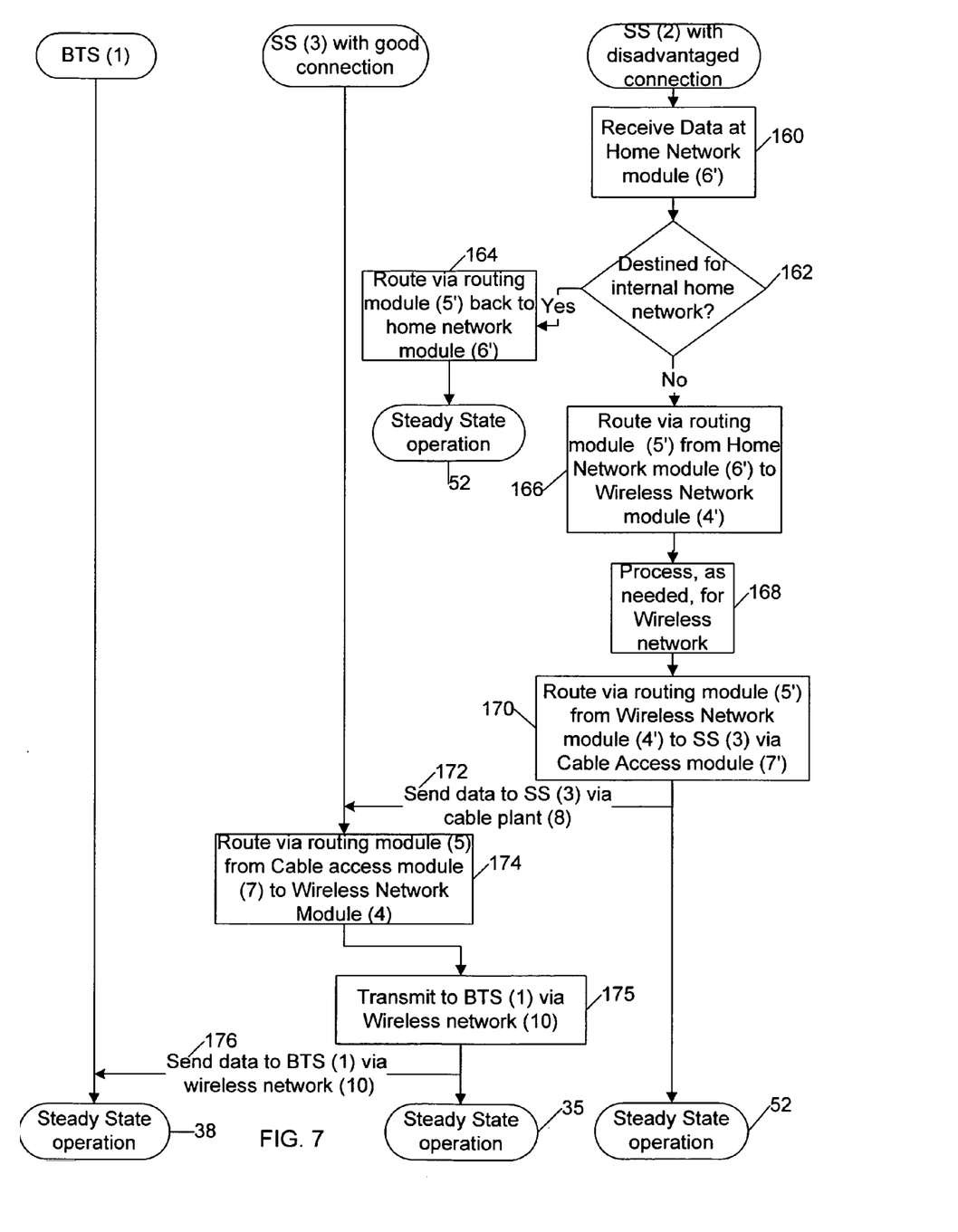
FIG. 7 is a flow diagram illustrating relay of data from a subscriber station over the cable plant.
Figure 8:
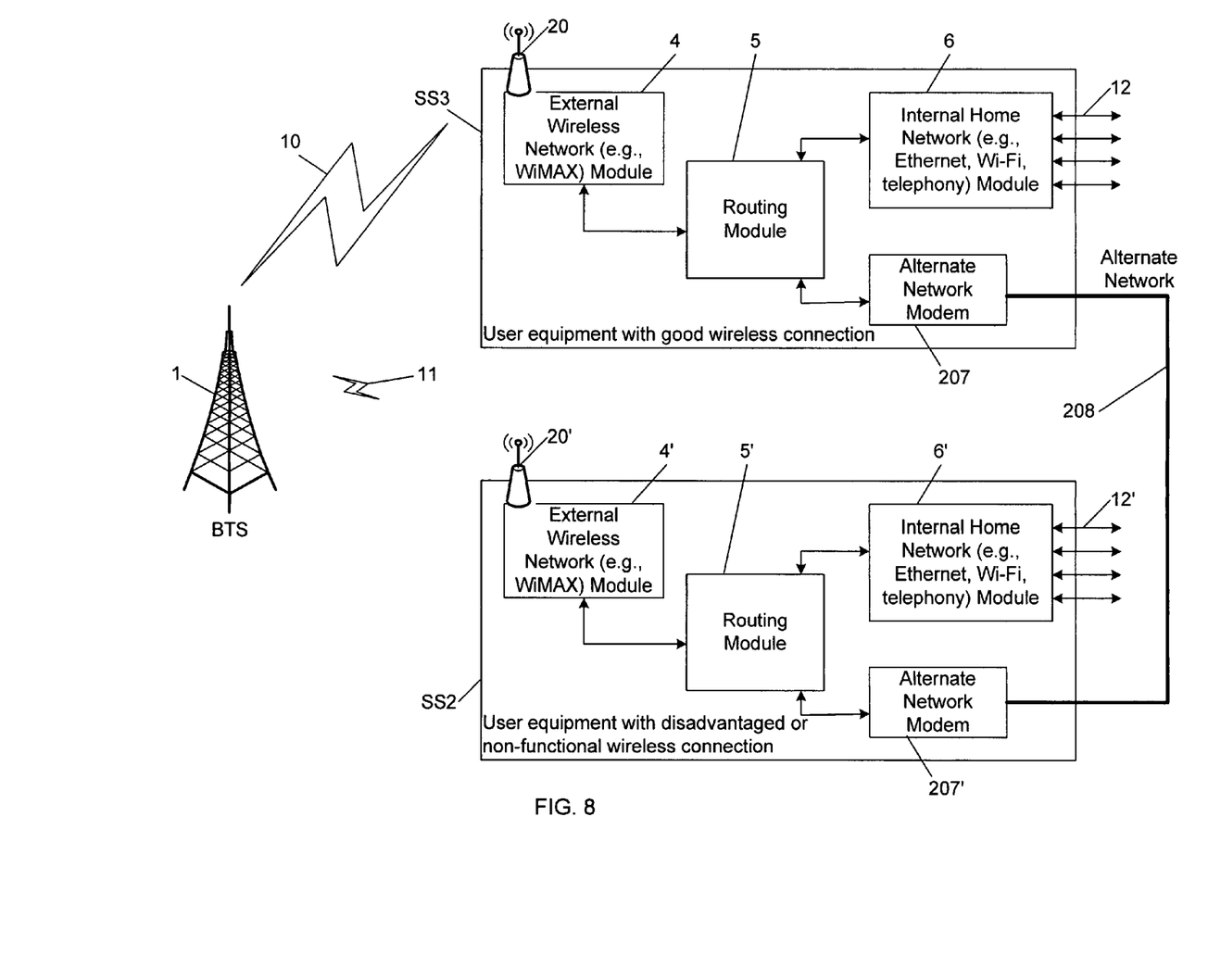
FIG. 8 is a block diagram of an extended communication system according to another embodiment of the invention.

FIGS. 1 to 8 illustrate methods and systems according to exemplary embodiments of the present invention for extending a wireless system to provide service to a weak signaled user without having to install additional base transmitter stations. FIG. 1 and FIG. 8 are block diagrams of the basic components of the system, while FIGS. 2 to 7 are flow diagrams illustrating operation of the system.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

A wireless network typically includes a plurality of base transmitter stations ("BTS") along with wireless subscriber stations ("SS") which may be fixed or mobile. A fixed location wireless subscriber station is typically located in a home or office building. The wireless network receiver and transmitter is typically connected to the home or building network system, which may include television sets, computers, telephones, wireless fidelity ("WiFi") devices, and the like.

The extended wireless system and method of the exemplary embodiments of this invention allow the boundaries of a wireless network to be extended without necessarily having to install additional base transmitter stations, which is relatively expensive. This also allows users who have a disadvantaged or weak wireless connection to a BTS, or else have a non-functional wireless connection, to continue to receive and send data over the network. This will allow network communications to and from subscriber stations having intervening structure between their wireless receiver and the associated BTS, such as buildings, hills, or other geographical features, as well as subscriber stations which have a weak or malfunctioning wireless link for any reason.

FIG. 1 illustrates part of the system comprising one base transmitter station 1 (hereinafter "BTS1") and two wireless subscriber stations 2, 3 (hereinafter referred to as "SS2" and "SS3"), which may be fixed in location or may be mobile. The first wireless subscriber station (SS2) has a weak or unacceptable connection 11 to BTS1, while the second wireless subscriber station (SS3) has a sufficiently strong or acceptable connection 10 to BTS1. SS2 and SS3 are also connected via an existing wired link such as a cable plant 8 or a power line or other alternative communication path. This connection may be a direct physical connection or a connection provided by a wireless link. Where the wired link is a cable plant, the subscribers may receive cable TV signals over the cable plant.

Although the two subscriber stations 2, 3 are shown adjacent one another in FIG. 1, it will be understood that the stations need not be physically adjacent one another and there may be other subscriber stations between SS2 and SS3 also linked to cable plant 8. The cable plant 8 can be a portion of a cable television system that shares signals with a group of subscriber stations, for example. Additionally, although both subscriber stations communicate with the same base transmitter station 1 in the illustrated embodiment, they may communicate with different base transmitter stations in the network in alternative embodiments. Additionally, the internal home network module 6, 6' may be eliminated in other embodiments and replaced with a single home input/output port connected directly to the external wireless network module 4, 4'. In this case the routing module 5, 5' may also be eliminated and the external wireless network module 4, 4' is also connected directly to the cable access module 7, 7'.

Each wireless subscriber station SS3, SS2 basically comprises an external wireless network module 4, 4' having an antenna 20, 20' for communication with the local base transmitter station 1 (or two different local base transmitter stations), a routing module 5, 5' connected to the external wireless network module, and an alternative communication path module or cable access module 7, 7' connected to the routing module 5, 5' and to the respective point of entry of cable plant 8 or alternative wired connection such as power line. The routing module 5, 5' may also be connected to an internal home network module 6, 6'. The routing module 5, 5' and the cable access module 6, 6' are programmed or configured to provide an alternative path for received or transmitted data when a wireless subscriber station, such as SS2, has an unacceptable connection to a wireless network base station 1. This alternative path uses an otherwise unused portion of the frequency spectrum of the cable plant 8, as will be described in more detail below. In one embodiment where the existing link between the subscriber stations is a wired link such as a power line, modules 6, 6' can be referred to as wire access modules configured to access the wired link.

The home network module 6, 6' has input/output ports 12, 12' for providing connections to various devices for communications over the network and cable plant, such as telephones, desk top and personal computers, personal digital assistants, WiFi devices, and the like. The connections can be wireless and/or wired connections. The extended wireless network system illustrated in FIG. 1 will allow the subscriber station to receive and send data over a wireless network, and will relay data to and from devices in a home network via the associated cable plant and another subscriber station if the wireless link between the subscriber station and wireless network is determined to be weak or non-existent. The subscriber stations illustrated in FIG. 1 may each be implemented as a single unit in a single box or housing or as separate functional units with communication links between the units. Alternatively some of the modules, such as modules 5 and 6, may be provided by an off the shelf module such as a Wi-Fi wireless router while the others are incorporated in a single unit or are separate functional units. The subscriber stations may also provide for receiving standard cable TV signals via the cable plant 8 through the integration of a cable set top box functionality, or a separate module may be provided for receiving conventional cable signals and transmitting them to devices such as televisions. Additionally, although a cable plant is used for relaying signals in the illustrated embodiment, it will be understood that other existing wire connections between the subscriber stations may be used, such as electric power lines.

The wireless link 10, 11 may be, for example, an Institute of Electrical and Electronics Engineers (IEEE) 802.16 standard wireless air interface (also known as "WiMAX"), a wireless fidelity (Wi-Fi) or IEEE 802.11 link, an Evolution, Data-Optimized (EVDO) wireless link, or other wireless link or interface.

In one embodiment, an unacceptable wireless link between a subscriber station and a base transmitter station is a link which is either completely non-functional or which is too weak to transmit information at a high data rate. An acceptable wireless link is a link which is strong enough or has sufficient bandwidth to transmit high data rate information.

As described further below, in the system of FIG. 1, we assume that SS2 has an unacceptable wireless link connection and that SS3 has an established connection. In order to provide high rate data services to SS2, SS3 assumes the role of a proxy server for SS2 which likewise assumes the role of a proxy client within the wireless communication system of which BTS1 is a component. (Often times in technical literature, the proxy server is referred to as simply a proxy or forwarding agent and the proxy client is referred to as simply a client.) As such, data intended for SS2 is routed through SS3. SS3 extracts the information received from BTS1 and intended for SS2 and retransmits it on cable plant 8 at a frequency that is unused by the cable plant. The SS2 receives the data over the cable plant and processes it in a similar manner as it would if it had received the data over the wireless link 11. Likewise, data from SS2 intended for BTS1 is routed over the cable plant 8 to the SS3. The SS3 transmits the data over the wireless link 10 to the BTS1.

For example, television signals are typically carried on the cable plant 8 between 54 MHz and 864 MHz Also, downlink digital signals for cable modems are carried between 54 MHz and 864 MHz. Uplink signals for cable modems are carried from 6 MHz to 54 MHz. Typically frequencies above 864 MHz are unused. However, the coaxial cable used to implement a typical cable plant is capable of carrying signals above 864 MHz with a minimal insertion loss up to approximately 1600 MHz.

Thus, within a limited geographic range, the cable plant provides an efficient means of communication between subscriber stations. The range over which the signal is carried depends upon the physical distance between the two subscriber stations as well as the number of intervening active and passive elements on the cable plant. For example, in a typical cable plant, amplifiers are placed approximately each 50-150 meters. The amplifiers are not as broadband as the coaxial cable and provide some level of isolation between the various segments of the cable plant at high frequencies. This type of operation is advantageous to the invention in that it allows for frequency re-use among geographically separated segments of the cable plant.

Figure 2:
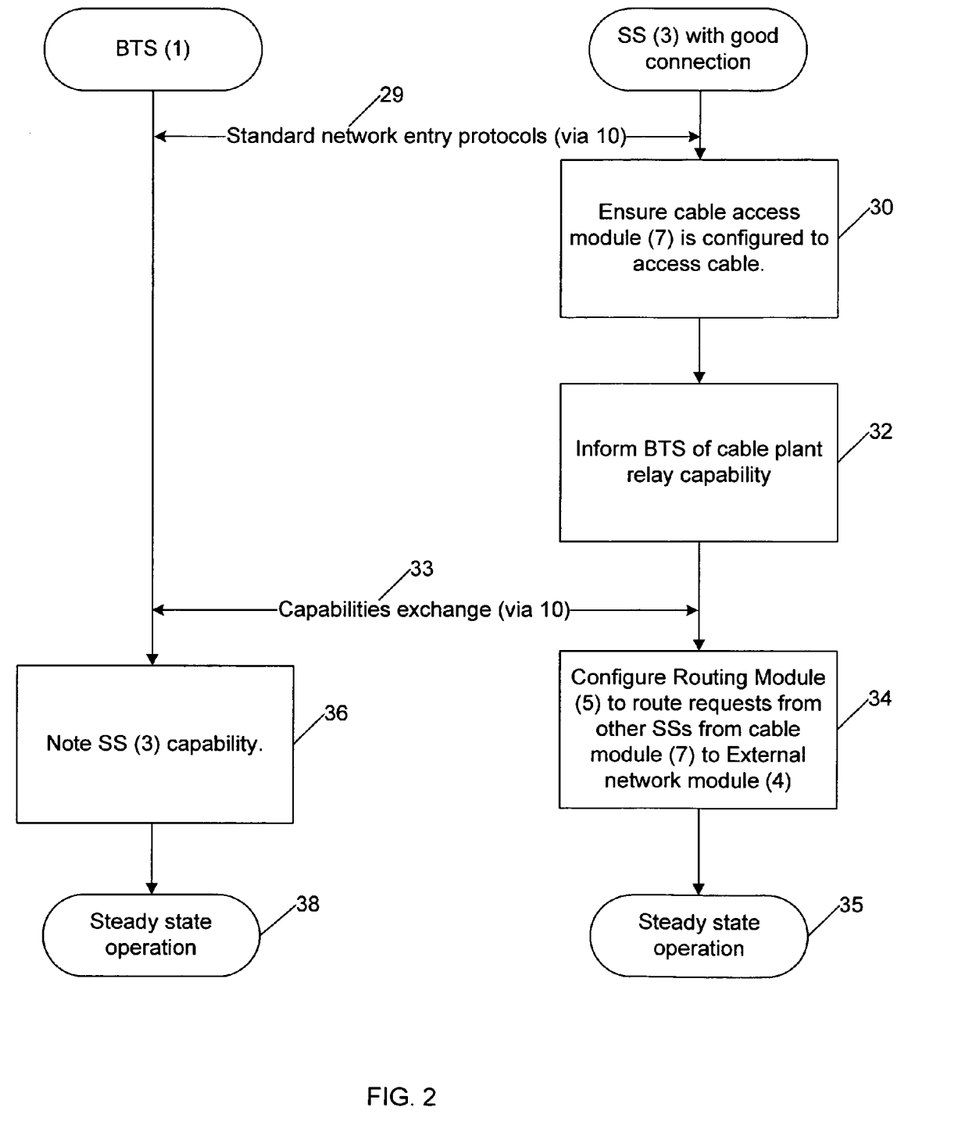
FIG. 2 is a flow diagram illustrating network entry of a subscriber station with a good wireless connection to a base station of the network.

FIG. 2 is a flow diagram illustrating the wireless network entry of a subscriber station, such as SS3, which has an acceptable (strong) wireless link 10 to the base station 1. In one embodiment, the steps of the method are implemented by the external wireless network module 4, the routing module 5 and the unused cable spectrum access module 7. At a step 29, standard network entry protocols are first carried out via wireless link 10 between a base station and the subscriber station. In the next step 30, the external wireless network module 4 ensures that the cable access module 7 is configured to access the cable plant 8.

In one embodiment, the cable access module 7 sends one or more broadcast messages over the cable plant 8 requesting a response from any other subscriber station which successfully receives the message. The cable access module 7 accumulates the responses and develops a table of accessible subscriber stations, their identity and negotiated capabilities. In one embodiment, the cable access module 7 sends a broadcast message over a plurality of carrier frequencies in order to determine an advantageous frequency at which to communicate with the various other subscriber stations. Alternatively, each subscriber station may be initially set up with the identity of one or more subscriber stations and a frequency at which to establish communication therewith. In one embodiment, the cable access module 7 measures the signal level, noise level or other link quality level to determine a candidate frequency at which to initiate communication.

External wireless network module 4 then informs BTS1 of the cable plant relay capability (step 32) in a capabilities exchange 33 via wireless link 10. One of the modules of SS3, for example, the external wireless network module 4, then configures the routing module (step 34) to route requests from other subscriber stations received over the cable plant 8 via the cable access module 7 to the external network module 4. SS3 is now active in steady state operation (35). In addition, BTS1 notes the capability of SS3 to relay signals via the cable plant 8 (step 36), and continues in a steady state operation (38).

Figure 3:
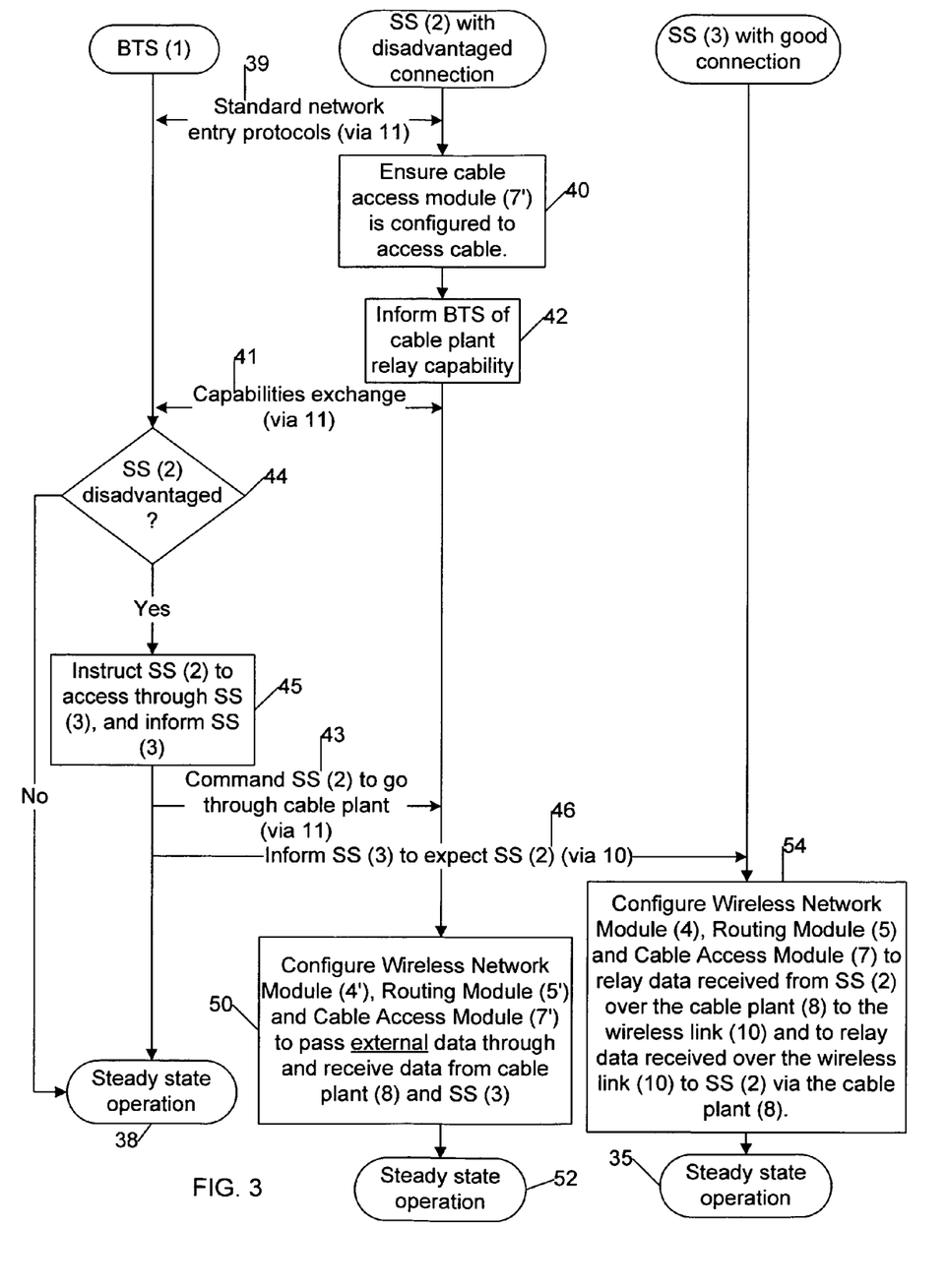
FIG. 3 is a flow diagram illustrating network entry of a subscriber station with a weak or disadvantaged wireless connection.

FIG. 3 is a flow diagram which illustrates one example method of network entry for a subscriber station, such as SS2, with a disadvantaged or unacceptable yet functional wireless link 11 to a base station 1 such as is illustrated in FIG. 1. The illustrated method assumes that communication is established with the base station but the link is unacceptable, for example the data rate is too low. At step 39, standard network entry protocols are first carried out or attempted via link 11 to establish communication with the base station. SS2 then ensures that the cable access module 7' is configured to access the cable plant 8 (step 40), and external wireless access module 4' informs BTS1 of the cable plant relay capability in a capabilities exchange 41 via wireless link or connection 11 (step 42). Based on the received signal strength, signal-to-noise ratio, bit error rate, packet error rate, modulation mode, maximum data rate or other link performance metrics as well as other parameters such as system loading, the subscriber station's service level agreement, quality of service requirement or current/expected demand and the like, BTS1 determines whether SS2 has an unacceptable or weak link to BTS1 (step 44). Alternatively, SS2 can make that determination based on metrics similar to those used by BTS1. If SS2 does have an unacceptable or weak link 11, BTS1 sends a command 43 to SS2 to send and receive data through cable plant 8 (45). Optionally, it also informs SS3 via link 10 to expect communications to and from SS2 (46). If BTS1 determines that link 11 is acceptable in step 44, BTS1 simply returns to steady state operation (38) without instructing SS2 or SS3 to change their mode of communication.

When SS2 receives the command 43 from BTS1 to communicate via the cable plant 8, it configures the wireless network module 4', the routing module 5' and the cable access module 7' to pass external data through and receive data from the cable plant 8 and SS3 (step 50) (External data refers to data to be sent from SS2 to the outside world over the network, as opposed to home network data which is simply transferred among the various home network elements.) SS2 is then ready in a steady state of operation 52. When SS3 receives the command 46 from the base station 1 to relay data to and from SS2 via the cable plant 8, the wireless network module 4, routing module 5, and cable access module 7 of SS3 are configured to relay data received from SS2 over the cable plant to the wireless link 10 and to relay external data received over the wireless link 10 which is addressed to SS2 to SS2 via the cable plant 8 (step 54). SS3 then returns to steady state operation (35).

Figure 4:
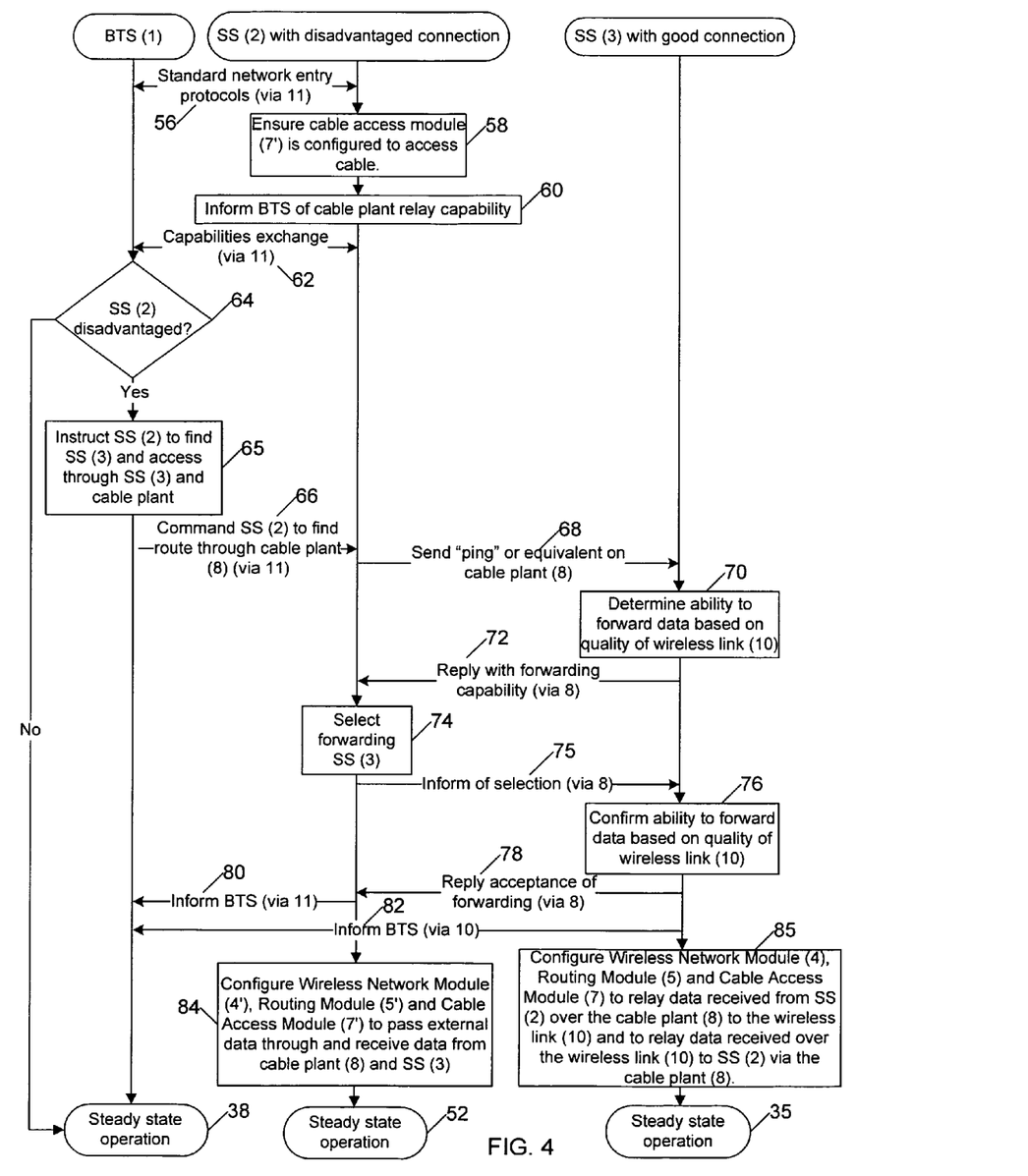
FIG. 4 is a flow diagram illustrating an alternative network entry method for a subscriber station with a weak wireless connection.

FIG. 4 illustrates an alternative method for network entry of a subscriber station (e.g. SS2 of FIG. 1) with an unacceptable or weak wireless link 11 with the network. On start up of SS2, standard network entry protocols 56 are passed back and forth between BTS1 and the external wireless network module 4' of SS2 via the wireless link 11. The wireless network module 4' then ensures that the cable access module 7' is configured to access cable plant 8 (step 58), and informs BTS1 of the cable plant relay capability (60), via a capabilities exchange 62 over wireless link 11. Based on this exchange, BTS1 can determine whether wireless link 11 is unacceptable, such that SS2 is disadvantaged (64). Alternatively, SS2 can make the determination. If SS2 is found to be disadvantaged, the base station instructs SS2 to find SS3 and to access SS3 through the cable plant 8 (step 65) by sending a command message 66 over wireless link 11. If BTS1 determines that the wireless link 11 is acceptable, it simply returns to steady state operation 38.

In the embodiment of FIG. 4, SS2 is instructed to find a route to a specific subscriber station, SS3. On receipt of the command 66, SS2 will send a "ping" or equivalent message over cable plant 8 (68) to SS3. On receipt of this message, the external wireless access module 4 of SS3 determines its ability to relay data based on the quality of its own wireless link 10 (step 70), and sends a message 72 to SS2 via cable plant 8 with its forwarding capability. SS2 then selects forwarding through SS3 (step 74), and the external wireless network module 4' sends a message 75 via cable access module 7' and cable plant 8 to SS3 informing the subscriber station 3 that it has been selected for forwarding or relaying information to and from SS2 via the cable plant. SS3 then re-confirms its ability to forward data based on the quality of its wireless link 10 (76). SS3 then sends a reply 78 via cable plant 8 to SS2 accepting the responsibility for forwarding data. The external wireless access module 4' of SS2 sends a message 80 informing BTS1 that SS3 has accepted responsibility for relaying data via the connecting link 11. SS3 sends a similar message 82 to BTS1 via connecting link 10.

If SS3 sends a message to SS2 indicating that it is unable to forward communications or if SS3 declines to forward data to and from SS2, SS2 will look for another subscriber station capable of accepting this responsibility, or will go back to BTS1 for instructions.

Assuming that SS3 is able to forward data to and from SS2, and has confirmed its ability to do so in message 75, SS2 configures wireless network module 4', routing module 5', and cable access module 7' to pass external data through and to receive data from cable plant 8 and SS3 (step 84). In addition, SS3 configures its wireless network module 4, routing module 5, and cable access module 7 to relay data received from SS2 over the cable plant 8 to base station 1 via wireless link 10, and to relay data received over the wireless link 10 and addressed to SS2 to SS2 over cable plant 8 (step 85). After steps 84 and 85 are complete, both SS2 and SS3 return to steady state operation 52, 35, respectively.

Figure 5:
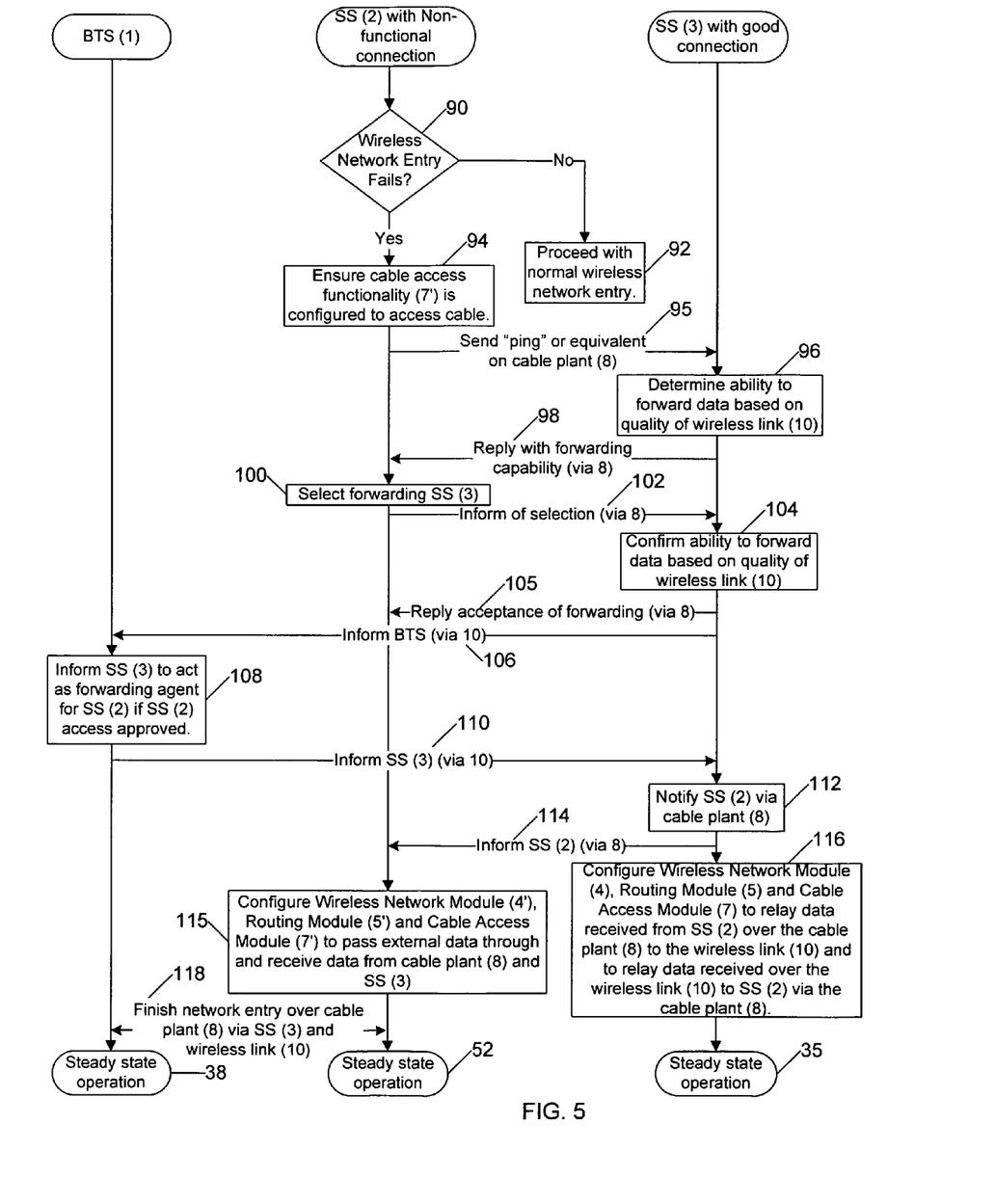
FIG. 5 is a flow diagram illustrating network entry of a subscriber station with a non-functional wireless connection.

In some cases, a subscriber station (say SS2) may have a completely non-functional wireless connection. A method of handling network entry of SS2 with a non-functional wireless connection to the local base station is illustrated in FIG. 5. SS2 will first attempt to enter the wireless network (step 90). If wireless entry succeeds, SS2 will proceed with normal wireless operation (step 92). If wireless entry fails completely, a selected module of SS2, such as external wireless access module 4', first ensures that cable access module 7' is configured to access cable plant 8 (step 94). After this step, SS2 sends a "ping" or equivalent broadcast message on cable plant 8 (95), asking any subscriber station with a sufficiently strong wireless link to the network to respond. Alternatively, SS2 may be programmed with the addresses of one or more subscriber stations to contact via the cable plant 8 if wireless entry to the network is unsuccessful, in which case message 95 will be addressed to one or more specific subscriber stations.

In this example, SS3 receives the ping. The external wireless network module 4 of SS3 then determines its ability to forward data, based on the quality of wireless link 10 (96), and sends a reply 98 to SS2 over cable plant 8 indicating its forwarding ability. External wireless module 4' of SS2 then selects forwarding via SS3 (100), and informs SS3 of its selection (102) via cable plant 8. The external wireless network module 4 of SS3 confirms its ability to forward data based on the quality of its wireless link (104), and relays its acceptance of responsibility for forwarding to SS2 (105), using cable plant 8. In addition, the external wireless network module 4 of SS3 informs the base station via wireless link 10 that it will be relaying data to and from SS2 (106). The base station 1 then instructs SS3 to act as proxy or forwarding agent for SS2 if SS2 access is approved (step 108), sending a command 110 to the external wireless network module 4 of SS3 with this instruction via wireless link 10. SS3 then notifies SS2 of the approval of SS2 to act as proxy or forwarding agent (112), sending a message 114 to this effect to SS2 over cable plant 8.

SS2 then configures wireless network module 4', routing module 5', and cable access module 7' to pass external data through and receive data from cable plant 8 and SS3 (step 115). In addition, SS3 configures its wireless network module 4, routing module 5, and cable access module 7 to relay data received from SS2 over cable plant 8 to the wireless link 10 and to relay data addressed to SS2 received from wireless link 10 to SS2 via the cable plant 8 (step 116). SS2 finishes its own network entry with BTS1 over cable plant 8 via SS3 and wireless link 10 (118). BTS1, SS2 and SS3 are now in steady state wireless operation (38, 52, and 35, respectively).

It should be noted that the method, described in connection with FIGS. 3, 4 and 5 can be implemented at any time the link with the base station becomes unacceptable. One skilled in the art can further see that the method described in FIG. 5 could be used by subscriber stations connected by alternative networks to perform a self-discovery of other subscriber stations connected via the alternate network. In instances where a quantity of data transmitted by some subscriber stations is destined for other subscriber stations connected via the alternate network, this can have the advantage of offloading traffic from the wireless network. The method could also be used to allow a subscriber station with a functional link to the BTS to find a plurality of other subscriber stations that have a light load and impose upon them to relay some portion of the data.

FIG. 6 is a flow diagram illustrating a method of receiving (Rx) data at SS2 through SS3 after SS2 and SS3 have been configured for the relay of data to and from SS2 over cable plant 8, SS3, and wireless link 10. It will be understood that this configuration may have been set up according to the method illustrated in FIGS. 3, 4 or 5. Base station 1 is in steady state operation 38. Wireless data addressed to either SS2 or SS3 will be sent to SS3 via the wireless link 10 (126). The external wireless network module 4 of SS3 first determines whether the received data is addressed to SS3 (128). If the information is intended for SS3, and is management data (130), it is consumed or internally processed in the wireless network module 4 (132). SS3 then returns to steady state operation (35). If the data is not management data, the wireless network module 4 forwards the data to the home network module 6 via routing module 5 (135), and the system returns to steady state operation (35).

If the message or data received at step 128 is not for SS3, wireless network module 4 then determines whether it is addressed to SS2 (step 138). If it is not addressed to SS2 or SS3, the data is discarded (140), and the system returns to steady state operation (35). If the data is addressed to SS2, the wireless network-module 4 of SS3 forwards the data to SS2 (144) via routing module 5 and cable access module 7 over cable plant 8 (145). SS3 then returns to steady state operation (35).

SS2 receives the data from SS3 via cable access module 7', and routes the data through routing module 5' to wireless access module 4' (148). Module 4' determines whether the data is management data (150). If the data is management data, it is consumed by the wireless network module 4' (step 152), and the system returns to steady state operation (52). If it is not management data, the data is forwarded from wireless access module 4' to the home network module 6' via routing module 5' (155). SS2 then returns to steady state operation (52).

In the embodiment illustrated in FIG. 6, received data is routed first to the wireless network module 4' before routing back to the home network module 6' if it is not management data. This data routing allows for end-to-end encryption being accomplished at the wireless network modules and can also allow the received data to be encapsulated in wireless airlink format or at least tagged with some information. However, if encryption or encapsulation is not used, received data can be forwarded by the routing module 5' directly to the module for which it is intended, i.e. either the home network module 6' or the wireless network module 4'.

FIG. 7 illustrates a method for relaying or transmitting data (Tx) from SS2 via the cable plant 8 and SS3. Again, initial configuration for performing the data transmission steps may have been carried out using any of the methods illustrated in FIGS. 3 to 5. Data for transmission is first received by home network module 6' from any of the home network devices of subscriber station 2, such as a home computer, telephone, or the like (step 160).

In step 162, module 5' first determines whether the data is destined for the internal home network If the data is destined for the home network, for example for another peripheral device connected to module 6', it is directed by module 5' back to the home network module 6' (step 164), and the system returns to steady state operation (52). If the data is not destined for the home network, it is routed by module 5' from the module 6' to the wireless network module 4' via routing module 5' (step 166). It is then processed as needed by the wireless network module 4' (168), and routed by the routing module 5' from the wireless network module 4' to the cable access module 7' (170). The data is then sent to SS3 via the cable plant 8 (172), and SS2 returns to steady state operation (52).

On receipt of data from SS2 via cable plant 8, SS3 will route the data via routing module 5 from the cable access module 7 to the wireless network module 4 (174). The data is then transmitted from wireless network module 4 to BTS1 (step 175) via wireless network link 10 (176), and SS3 returns to steady state operation (35). BTS1 will relay the data to the addressee and will then return to steady state operation (38).

Although the embodiment described above uses an existing cable plant to relay data to and from a subscriber station having a weak or non-existent wireless link to a wireless network, it will be understood that other existing or available connections between subscriber stations may alternatively be used for this purpose. For example, an existing electrical power line may be used for relaying data back and forth between the first or disadvantaged subscriber station and the network, at an appropriate carrier frequency.

FIG. 8 is a block diagram similar to FIG. 1 in which like reference numerals refer to like modules or parts. As in FIG. 1, the modified system comprises one base transmitter station 1 (hereinafter "BTS1") and two wireless subscriber stations 2, 3 (hereinafter referred to as "SS2" and "SS3"), which may be fixed in location or may be mobile. The first wireless subscriber station (SS2) has a weak or unacceptable connection 11 to BTS1, while the second wireless subscriber station (SS3) has a sufficiently strong or acceptable connection 10 to BTS1. In FIG. 8, SS2 and SS3 are also connected via a link provided by an alternate network 208. This connection may be a direct physical connection or a connection provided by a wireless link. In this more generic embodiment the unused cable spectrum access modules 7, 7' of SS3 and SS2, respectively, in FIG. 1 are replaced with alternate network modems 207, 207', respectively, which allow communication between SS3 and SS2 via alternate network 208. A variety of embodiments of elements 207, 207', and 208 are feasible. In one embodiment, alternate network 208 is the cable plant and alternate network modems 207, 207' are modems specialized to communicate using spare spectrum on the cable plant. In another embodiment, alternate network 208 is the cable plant and alternate network modems 207, 207' are cable modems configured to communicate through the cable modem network via the cable modem head end. In another embodiment, alternate network 208 is the power lines and alternate network modems 207, 207' are modems specialized to communicate over the power lines. In another embodiment, alternate network 208 is a Wi-Fi wireless network, alternate network modem 207 is a Wi-Fi access point and alternate wireless modem 207' is a Wi-Fi client modem. In another embodiment, alternate network 208 is the a Wi-Fi wireless network and alternate network modems 207, 207' are Wi-Fi client modems configured to communicate in Ad Hoc mode. In another embodiment, alternate network 208 is an Ethernet LAN and alternate network modems 207, 207' are Ethernet line cards. In another embodiment, alternate network 208 is the phone lines and alternate network modems 207, 207' are dial-up modems. In another embodiment, alternate network 208 is the phone lines and alternate network modems 207, 207' are DSL modems configured to route data to one another via some DSL network operator's network. In another embodiment, alternate network 208 is completely a proprietary design and alternate network modems 207, 207' are modems specialized to communicate over the proprietary network. Operation of the system illustrated in FIG. 8 will be identical to that of FIG. 1, and reference is made to FIGS. 2 to 7 in this regard, the only difference being that any reference to the cable access modules 7, 7' and cable plant should be replaced with alternative network modems 207, 207' and alternate network 208.

In the above embodiments, the data transmitted over the wired link between subscriber stations may be encrypted, if intended for secure network communications. Encryption will not be necessary if the wireless link is in an unsecured network, such as an unsecured Wi-Fi network. The data may also be encapsulated in Ethernet, Transmission Control Protocol/Internet Protocol ("TCP/IP"), Universal Datagram Protocol/Internet Protocol ("UDP/IP"), or other protocols.

In IEEE 802.16 networks, when a subscriber station (SS) is in direct communication with the base transmitter station (BTS) over the wireless link, it takes its user data, maps it to a Media Access Control ("MAC") connection of the appropriate Quality of Service ("QoS"), and buffers it until an appropriate transmit opportunity is allocated to the SS by the BTS. When the opportunity arises, the SS checks the size of its allocation, determines how much data can be transmitted, fragments the user data packets into smaller pieces if necessary, pre-pends a MAC header and possibly subheaders, optionally calculates and appends a cyclic redundancy check (CRC), and encrypts the data using an SS-specific or connection-specific encryption key. In a typical 802.16 implementation, the SS has a mere five milliseconds between knowing its allocation, and performing fragmentation, packaging, encryption and transmission.

Regardless of whether the wireless links in the above embodiments are 802.16 air interfaces or other types of wireless links, it would be preferable for the disadvantaged subscriber station communicating over the wired link to be able to carry out all of the required processing of the data to be transmitted, with the other subscriber station (e.g. SS3) simply acting as a pass through. If the processing time permitted is longer than five milliseconds, it would be possible for SS3 to pass allocation information to SS2 and to let SS2 do all the processing of its own data. SS3 could then receive the processed data from SS2 on the wired link, and transmit it to BTS1 over the wireless link 11 in an allocation for SS2. This alternative involves a maximum amount of processing of the data transmitted over the wired link (e.g. cable plant 8).

Alternatively, the disadvantaged subscriber station, such as SS2, may simply accept data from the user and do nothing but transmit it over the wired link 8 to SS3. This involves the minimum amount of processing of data over the wired link. SS3 would then treat the data received from SS2 as its own data and do all the processing required for transmission over the wireless link 10. This alternative eliminates the need for the BTS to be informed that a disadvantaged SS2 exists, for instance eliminating messages 106, 110, and 114 and steps 108 and 112 of FIG. 5. Although this is a much less complex alternative, there may be QoS issues, for example if there are differences between the service level agreements of SS2 and SS3 such as SS2 having a service level agreement allowing the use of resources dedicated to providing a higher QoS than allowed by the service level agreement of SS3. Also, even if the data were encrypted over the wired link, SS3 would need to decrypt and then re-encrypt using its own wireless link encryption keys. This would cause the data from SS2 to become available as clear text in SS3, with resultant security issues and potential for security breaches. This less complex alternative would also preclude, compromise, or complicate at SS2 any OA&M, software updates, authentication, verification of service access ability to communicate with other network services such as short message services and data connections received. This alternative would therefore be preferable only for unsecured networks such as an unsecured Wi-Fi network.

While both of the above alternatives for processing SS2's data for transmission over the air are possible, something between these two extremes may be used. This would be a preferred embodiment for communication over an 802.16 air interface. SS2 could process its data fully, including encryption, as if it has infinite air resources. This would imply no fragmentation. SS3 would take the processed data and apply a special fragmentation over the wireless link 10. BTS1 would need to reassemble SS2's data upon receipt of the fragments created by SS3.

In one embodiment, the wireless network system and method of this invention allow a wireless network subscriber to receive and transmit data over the network even when the wireless connecting link between the subscriber station and the network base station is either weak or non-functional. This allows extension of a wireless network without necessarily having to install additional base stations, since users at the edges of the network can still communicate via the existing cable plant and another user station with a strong connection to a base station. This system also avoids the need to install extra base stations when there are structural or geographical obstructions between a user and a base station which would otherwise impede the direct wireless link, such as tall buildings, hills, and the like.

Those of skill in the art will appreciate that the various illustrative modules and method steps described in connection with the above described figures and the embodiments disclosed herein can often be implemented as electronic hardware, software, firmware or combinations of the foregoing. To clearly illustrate this interchangeability of hardware and software, various illustrative modules and method steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module or step is for ease of description. Specific functions can be moved from one module or step to another without departing from the invention.

Moreover, the various illustrative modules and method steps described in connection with the embodiments disclosed herein can be implemented or performed with a general purpose processor, a digital signal processor ("DSP"), an application specific integrated circuit ("ASIC"), field programmable gate array ("FPGA") or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such that the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent exemplary embodiments of the invention and are therefore representative of the subject matter which is broadly contemplated by the present invention. It is further understood that the scope of the present invention fully encompasses other embodiments and that the scope of the present invention is accordingly limited by nothing other than the appended claims.

The invention claimed is:

1. A method of communicating with a wireless subscriber station having an unsatisfactory wireless link with a local service base station, comprising:
    determining if a first wireless subscriber station having a first wireless link to a first base transmitter station ("BTS") of a wireless network has acceptable or unacceptable performance over the first wireless link;
    if the performance is unacceptable, identifying a second wireless subscriber station having a second wireless link to a second base transmitter station ("BTS") of the wireless network;
    configuring the second wireless subscriber station to act as a proxy for the first wireless subscriber station within the wireless network;
    configuring the first wireless subscriber station to send and receive data to the second wireless subscriber station over an alternative connection other than the wireless network, the alternative connection extending between the first and second wireless subscriber stations; and
    transmitting data from the first wireless subscriber station to the second BTS via the second wireless subscriber station.

2. The method as claimed in claim 1, wherein configuring the first wireless subscriber station comprises configuring said first wireless subscriber station to send and receive data over a cable plant.

3. The method as claimed in claim 2, wherein determining if the first wireless subscriber station has unacceptable performance comprises:
    establishing a connection between the first wireless subscriber station and the first BTS over the first wireless link; and
    wherein configuring the first wireless subscriber station to send and receive data over the alternative connection is in response to a command received by the first wireless subscriber station from the first BTS over the first wireless link.

4. The method as claimed in claim 3, wherein configuring the second wireless subscriber station to act as the proxy is in response to a command received by the second wireless subscriber station over the alternative connection.

5. The method as claimed in claim 3, wherein configuring the second wireless subscriber station to act as the proxy is in response to a command received by the second wireless subscriber station over the second wireless link.

6. The method as claimed in claim 2, wherein determining if the first wireless subscriber station has unacceptable performance comprises
    attempting network entry from the first subscriber station over the first wireless link to the first BTS;
    determining that the first wireless link is non-functional; and
    communicating a first message from the first wireless subscriber station to the second wireless subscriber station over the alternative connection.

7. The method as claimed in claim 6, wherein in response to the first message, the second subscriber station sends a notification over the second wireless link, the notification indicating that the second subscriber station is acting as the proxy for the first wireless subscriber station.

8. The method as claimed in claim 2, wherein the first BTS and the second BTS are the same BTS.

9. The method as claimed in claim 1, wherein configuring the first wireless subscriber station comprises configuring said first wireless subscriber station to send and receive data over a power line.

10. The method as claimed in claim 1, wherein configuring the first wireless subscriber station comprises configuring said first wireless subscriber station to send and receive data over an Institute of Electrical and Electronics Engineers (IEEE) 802.11 wireless link.

11. A communication system, comprising:
    first and second subscriber stations of a first wireless network each connected to a respective internal home network;
    an alternative connection of a second network connecting the first subscriber station to the second subscriber station;
    the first subscriber station having a first external wireless network module for receiving and transmitting wireless signals over a first wireless link and a first alternative connection access module linked to the first external wireless network module and linked to the alternative connection for receiving and transmitting data over the alternative connection;
    the second subscriber station having a second external wireless network module for receiving and transmitting wireless signals over a second wireless link and a second alternative connection access module linked to the second external wireless network module and linked to the alternative connection for receiving and transmitting data over the alternative connection;
    the second subscriber station being configured to act as a proxy for the first subscriber station within the wireless network if the quality of the first wireless link with the network is determined to be unacceptable; and
    the first and second subscriber stations being configured to relay data to and from the first external wireless network module via the first alternative connection access module, the alternative connection, the second alternative connection access module, the second external wireless network module, and the second wireless link when the second subscriber station is acting as a proxy for the first subscriber station.

12. The system as claimed in claim 11, wherein the alternative connection is a cable plant and each alternative connection access module comprises a cable access module for accessing an unused portion of the cable spectrum to send and receive data via said unused portion of the cable plant.

13. The system as claimed in claim 12, wherein each subscriber station further comprises a cable set top box module for receiving cable TV signals via the cable plant.

14. The system as claimed in claim 11, wherein the alternative connection is an electric power line.

15. The system as claimed in claim 11, wherein the alternative connection is a wireless link of a second wireless network.

16. The system as claimed in claim 11, wherein the alternative connection is a telephone line and each alternative connection access module comprises a dial-up modem.

17. A wireless network subscriber station, comprising:
an external wireless network module having an antenna for wireless communication with a base station of an external wireless network via a first wireless link;
a home network module configured to connect the subscriber station to a home network;
an alternative connection access module for selectively connecting the wireless network module to an alternative connection of a second network, the alternative connection providing an alternative communication path between the subscriber station and a second subscriber station of the external wireless network and second network; and
a configuration system for selectively configuring the subscriber station to pass data to and receive data from the external wireless network via the alternative connection and the second subscriber station if the first wireless link is unacceptable, wherein the second subscriber station acts as a proxy for the first subscriber station in the external wireless network if the first wireless link is unacceptable.

18. The subscriber station as claimed in claim 17, wherein the alternative connection comprises a cable plant and the alternative connection access module comprises a cable access module for accessing a cable plant to send and receive data over an unused portion of the cable spectrum.

19. The subscriber station as claimed in claim 17, wherein the alternative connection comprises an electrical power line and the alternative connection access module is configured to access the electrical power line to send and receive data over the power line.

20. The subscriber station as claimed in claim 17, wherein the alternative connection is a second wireless link of a second wireless network and the alternative connection access module comprises a second wireless network modem configured to communicate with the second wireless link.

* * * * *